US007673341B2

(12) United States Patent
Kramer et al.

(10) Patent No.: US 7,673,341 B2
(45) Date of Patent: Mar. 2, 2010

(54) SYSTEM AND METHOD OF EFFICIENTLY IDENTIFYING AND REMOVING ACTIVE MALWARE FROM A COMPUTER

(75) Inventors: Michael Kramer, Yonkers, NY (US); Matthew Braverman, Redmond, WA (US); Marc E. Seinfeld, Hong Kong (HK); Jason Garms, Woodinville, WA (US); Adrian M. Marinescu, Sammamish, WA (US); George Cristian Chicioreanu, Redmond, WA (US); Scott A. Field, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1093 days.

(21) Appl. No.: 11/012,892

(22) Filed: Dec. 15, 2004

(65) Prior Publication Data

US 2006/0130141 A1    Jun. 15, 2006

(51) Int. Cl.
*G06F 12/14* (2006.01)
(52) U.S. Cl. ...................................................... 726/23
(58) Field of Classification Search .................. 726/23
See application file for complete search history.

(56) References Cited

U.S. PATENT DOCUMENTS

| 6,928,550 | B1 * | 8/2005 | Le Pennec et al. ............. 726/1 |
| 2002/0144129 | A1 * | 10/2002 | Malivanchuk et al. ........ 713/188 |
| 2002/0174358 | A1 * | 11/2002 | Wolff et al. .................. 713/200 |
| 2002/0178374 | A1 * | 11/2002 | Swimmer et al. ............ 713/200 |
| 2003/0212906 | A1 * | 11/2003 | Arnold et al. ................ 713/201 |
| 2003/0229801 | A1 * | 12/2003 | Kouznetsov et al. ......... 713/200 |
| 2004/0073810 | A1 * | 4/2004 | Dettinger et al. ............ 713/201 |
| 2004/0172551 | A1 * | 9/2004 | Fielding et al. .............. 713/200 |
| 2005/0120238 | A1 * | 6/2005 | Choi .......................... 713/200 |
| 2006/0021041 | A1 * | 1/2006 | Challener et al. ............. 726/24 |

* cited by examiner

*Primary Examiner*—Nasser Moazzami
*Assistant Examiner*—Michael S McNally
(74) *Attorney, Agent, or Firm*—Workman Nydegger

(57) ABSTRACT

The present invention provides a system, method, and computer-readable medium for identifying and removing active malware from a computer. Aspects of the present invention are included in a cleaner tool that may be obtained automatically with an update service or may be downloaded manually from a Web site or similar distribution system. The cleaner tool includes a specialized scanning engine that searches a computer for active malware. Since the scanning engine only searches for active malware, the amount of data downloaded and resource requirements of the cleaner tool are less than traditional antivirus software. The scanning engine searches specific locations on a computer, such as data mapped in memory, configuration files, and file metadata for data characteristic of malware. If malware is detected, the cleaner tool removes the malware from the computer.

30 Claims, 6 Drawing Sheets

SYSTEM AND METHOD OF EFFICIENTLY IDENTIFYING AND REMOVING ACTIVE MALWARE FROM A COMPUTER

FIELD OF THE INVENTION

The present invention relates to computers and, more particularly, to removing active malware from a computer.

BACKGROUND OF THE INVENTION

As more and more computers are interconnected through various networks, such as the Internet, computer security has become increasingly more important, particularly from invasions or attacks delivered over a network or over an information stream. As those skilled in the art will recognize, these attacks come in many different forms, including, but certainly not limited to, computer viruses, computer worms, system component replacements, denial of service attacks, even misuse/abuse of legitimate computer system features—all of which exploit one or more computer system vulnerabilities for illegitimate purposes. While those skilled in the art will realize that the various computer attacks are technically distinct from one another, for purposes of the present invention and for simplicity in description, all of these attacks will be generally referred to hereafter as computer malware, or more simply, malware.

When a computer system is attacked or "infected" by a computer malware, the adverse results are varied, including disabling system devices; erasing or corrupting firmware, applications, or data files; transmitting potentially sensitive data to another location on the network; shutting down the computer system; or causing the computer system to crash. Yet another pernicious aspect of many, though not all, computer malware is that an infected computer system is used to infect other computers.

FIG. 1 is a pictorial diagram illustrating an exemplary networked environment 100 over which a computer malware is commonly distributed. As shown in FIG. 1, the typical exemplary networked environment 100 includes a plurality of computers 102-108, all interconnected via a communication network 110, such as an intranet, or via a larger communication network, including the global TCP/IP network commonly referred to as the Internet. For whatever reason, a malicious party on a computer connected to the network 110, such as computer 102, develops a computer malware 112 and releases it on the network. The released computer malware 112 is received by and infects one or more computers, such as computer 104, as indicated by arrow 114. As is typical with many computer malware, once infected, computer 104 is used to infect other computers, such as computer 106, as indicated by arrow 116, which, in turn, infects yet other computers, such as computer 108, as indicated by arrow 118. Clearly, due to the speed and reach of the modern computer networks, a computer malware 112 can "grow" at an exponential rate and quickly become a local epidemic that quickly escalates into a global computer pandemic.

A traditional defense against computer malware and, particularly computer viruses and worms, is antivirus software. Generally, antivirus software scans incoming data arriving over a network, looking for identifiable patterns associated with known computer malware. Frequently, this is done by matching patterns within the data to what is referred to as a "signature" of the malware. One of the core deficiencies in this malware detection model is that an unknown computer malware may propagate unchecked in a network until a computer's antivirus software is updated to identify and respond to the new computer malware.

As antivirus software has become more sophisticated and efficient at recognizing thousands of known computer malware, so too have the computer malware become more sophisticated. For example, many recent computer malware are polymorphic. These polymorphic malware are frequently difficult to identify by antivirus software because they modify themselves before propagating to another computer system. Thus under the present system, there is a period of time, referred to hereafter as a vulnerability window, that exists between when a new computer malware is released on the network 110 and when a computer system is updated to protect it from the computer malware. As the name suggests, it is during this vulnerability window that a computer system is vulnerable or exposed to the new computer malware. FIG. 2 is a block diagram of an exemplary timeline illustrating this vulnerability window. In regard to the following discussion, significant times will be identified and referred to as events. FIG. 2 illustrates a vulnerability window 200 with regard to a timeline 202 under which a malware is released that exploits a previously unknown vulnerability. Thus, as shown on timeline 202, at event 204, a malicious party releases a new computer malware. As this is a computer malware that exploits a previously unknown vulnerability, antivirus software may not be able to protect vulnerable computer systems from the attack. Correspondingly, the vulnerability window 200 is opened.

At some point after the new computer malware is circulating on the network 110, an antivirus software provider or similar entity detects the new computer malware, as indicated by event 206. As those skilled in the art will appreciate, typically the presence of the new computer malware is detected within a matter of hours by antivirus software providers. Once the computer malware is detected, the antivirus software provider may begin the process of identifying a pattern or signature by which the antivirus software may recognize the computer malware. As a result of these efforts, at event 208, the antivirus software provider releases an antivirus update, which addresses the computer malware. Subsequently, at event 210, the update is installed on a user's computer system, thereby protecting the computer system and bringing the vulnerability window 200 to a close.

As may be seen from the example provided above, which is only one representative scenario in which computer malware poses a security threat to a computer system, a vulnerability window exists between the time that a computer malware 112 is released on a network 110 and when an antivirus update is installed on a user's computer system to detect the new malware and close the vulnerability window. As a result, antivirus software providers typically produce malware "cleaners," e.g., computer software designed to identify and remove malware that is infecting a computer. One known method of "cleaning" a computer that is infected with malware includes searching each file stored on the computer for data characteristic of malware. When the data characteristic of malware is identified, the software cleaner performs certain steps designed to remove or quarantine the malware. However, searching each file stored on a computer for data characteristic of malware is a resource-intensive and time-consuming process. A computer may functional at a degraded performance level for a significant period of time when the cleaner is searching file data. Frequently, computer users will be deterred from using a malware cleaner or will not receive the full benefit a malware cleaner because of the time and resources required to search files.

SUMMARY OF THE INVENTION

The present invention provides a system, method, and computer-readable medium for identifying and removing active malware from a computer. Also, the present invention may be used to target high impact malware, e.g., malware that is particularly destructive and/or prolific. One aspect of the present invention is a method that includes obtaining a cleaner tool from a remote computer such as a download center. The cleaner tool may be obtained automatically with an automatic update service or the cleaner tool may be downloaded manually from a Web site or similar distribution system. When the cleaner tool is installed, a specialized scanning engine included in the cleaner tool searches the computer for active malware. If active malware is detected, the method identifies the malware and implements logic to remove the malware from the computer. Then, data that describes the actions performed by the cleaner tool, including the removal of any active malware, is transmitted to a remote computer that tracks the effectiveness of the cleaner tool and the spread of malware on a communication network.

Another aspect of the present invention is a method that determines when active malware is infecting a computer and implements logic to remove the active malware. This aspect of the present invention includes scanning specific locations on a computer for data characteristic of active malware. System configuration files such as a system registry are scanned for specific entries that are associated with active malware. Data in memory is compared to a database that contains signatures characteristic of active malware. Also, the file system is searched for file attributes when malware is infecting a computer. If active malware is identified, all of the actions required to remove the malware are entered in a "journal" prior to being executed. These actions include, but are not limited to, killing processes, deleting files, and removing entries in configuration files that are associated with active malware. Once all of the actions required to remove the active malware are entered in the journal, the actions in the journal are executed, resulting in the removal of the active malware.

In yet another aspect of the present invention, a software system is provided that is configured to remove active malware from a computer. More specifically, the software system includes an update application, an active malware-scanning engine, a stub module, an installer, a reporting module, and a signature database. The update application is configured to obtain a software package from a remote computer that includes the active malware-scanning engine, the stub module, the installer, the reporting module, and the signature database. The active malware-scanning engine is operative to identify and remove active malware from the computer using data contained in the signature database. In this regard, the stub module coordinates the actions performed by the active malware-scanning engine and manages the information exchanged with the user. When the active malware-scanning engine and stub module complete, a reporting module may transmit data that describes actions performed to a remote computer.

In still another embodiment, a computer-readable medium is provided with contents, i.e., a program that causes a computer to operate in accordance with the methods described herein.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention provides a system, method, and computer-readable medium for identifying and removing active malware from a computer. Embodiments of the present invention are included in a cleaner tool that may be obtained automatically with an update service or may be downloaded manually from a Web site or similar distribution system. The cleaner tool includes a specialized scanning engine that searches a computer for active malware (e.g., malware that contains program code and/or data loaded in memory). Since the scanning engine searches for active malware, the amount of data downloaded and resource requirements of the cleaner tool are much less than prior art systems. As a result, the cleaner tool is able to rapidly search and identify active malware installed on a computer. In this regard, the scanning engine searches specific locations on a computer, such as data mapped in memory, configuration files, and file metadata for data characteristic of active malware. If active malware is detected, the cleaner tool removes the malware from the computer and sends data that describes the actions performed by the cleaner tool to a remote computer for analysis by developers.

Although the present invention will primarily be described in the context of identifying and removing active malware from a computer, those skilled in the relevant art and others will appreciate that the present invention is also applicable to other types of malware than those described. The following description first provides an overview of a system in which the present invention may be implemented. Then methods that implement the present invention are described. The illustrative examples provided herein are not intended to be exhaustive or to limit the invention to the precise forms disclosed. Similarly, any steps described herein may be interchangeable with other steps, or combinations of steps, in order to achieve the same result.

Figure 1:
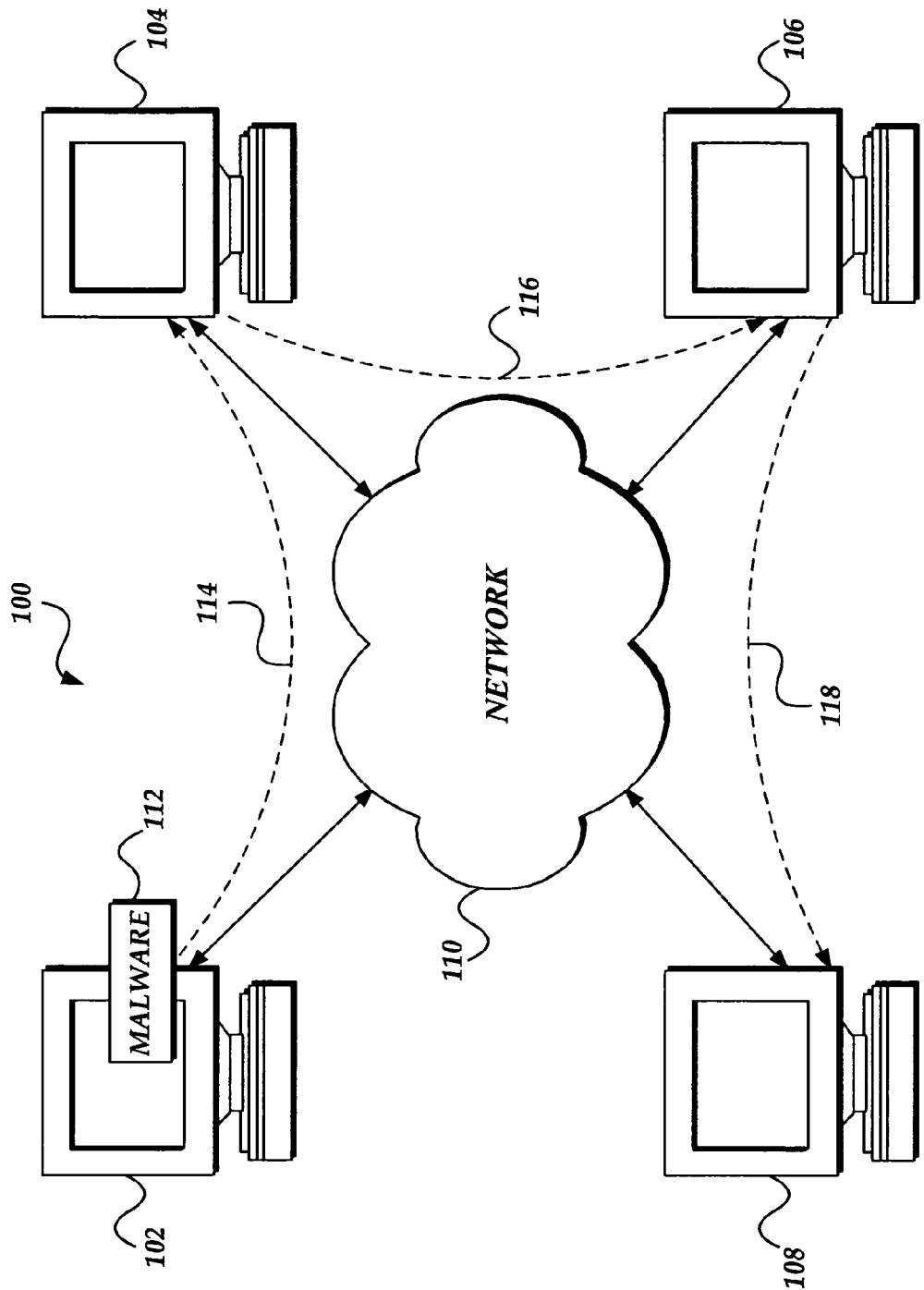
FIG. 1 is a pictorial diagram illustrating an exemplary network environment, as found in the prior art, over which a computer malware is commonly distributed.
Figure 2:
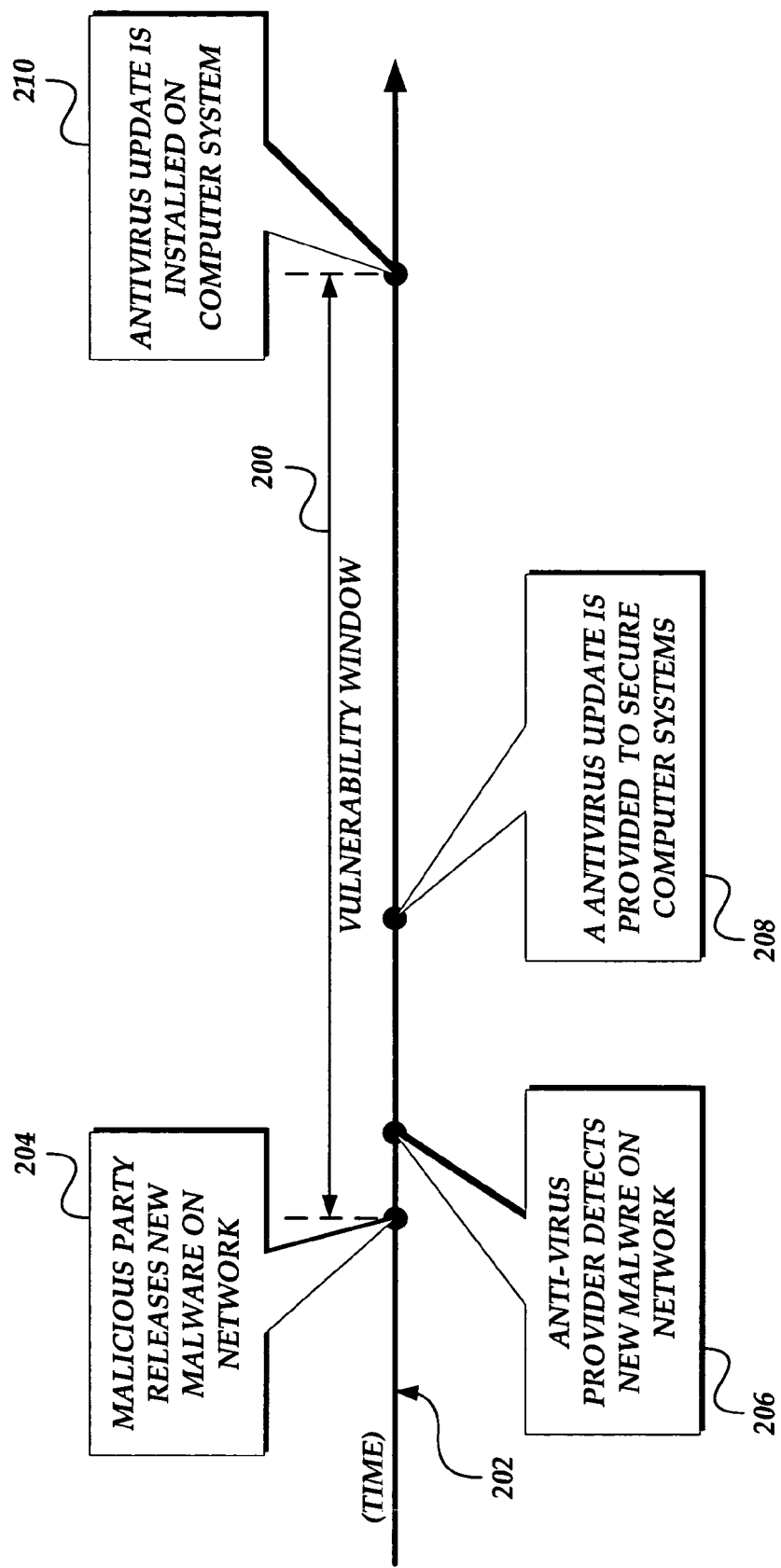
FIG. 2 is a block diagram illustrating an exemplary timeline demonstrating a vulnerability window with regard to computer malware released on a network.
Figure 3:
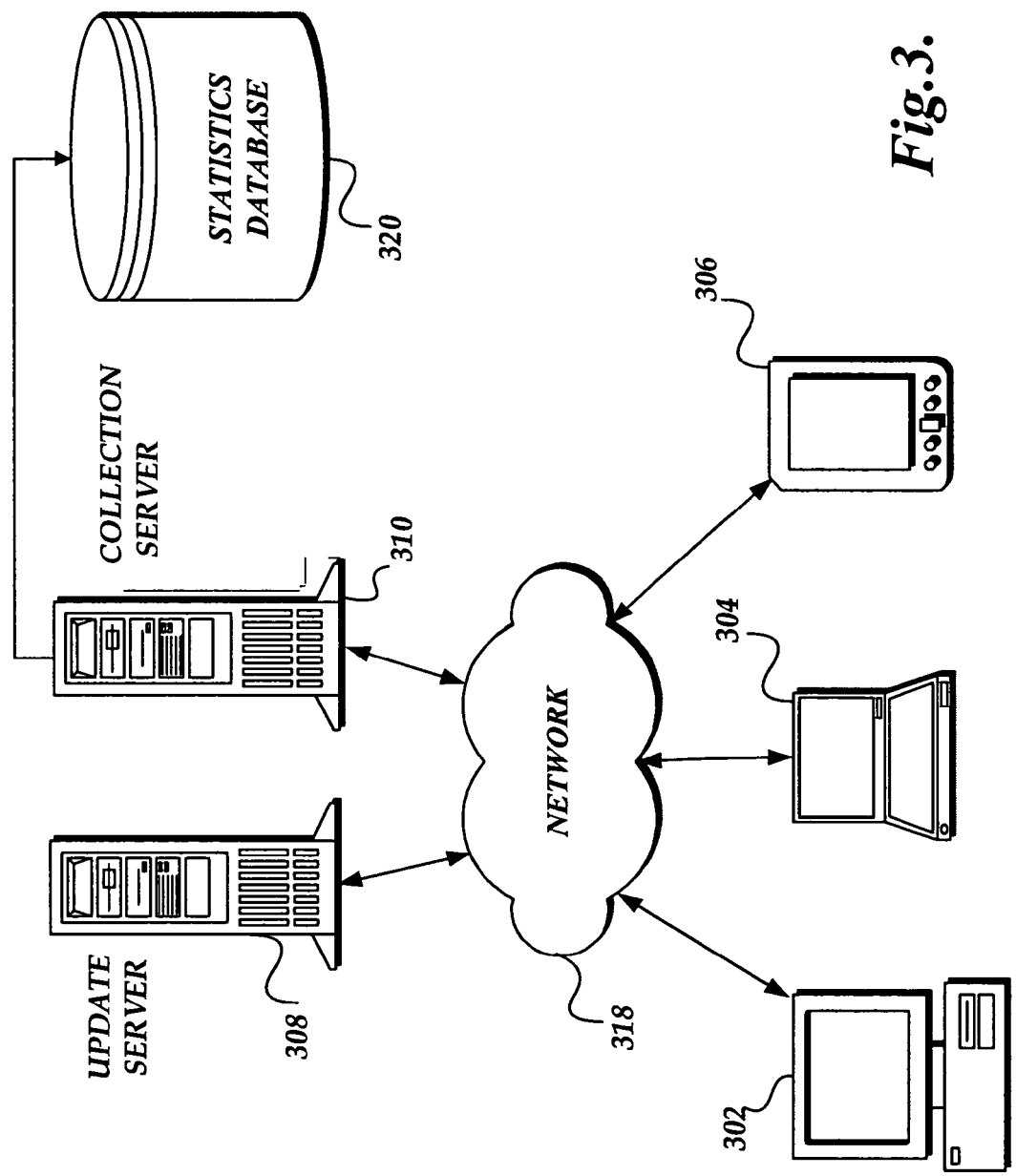
FIG. 3 is a pictorial diagram illustrating an exemplary network environment that may be used to implement aspects of the present invention.

Referring now to FIG. 3, the following is intended to provide an exemplary overview of one suitable computer networking environment 300 in which aspects the invention may be implemented. The illustrated environment 300 comprises a plurality of client computers 302, 304, and 306, an update server 308, and a collection server 310. The client computers 302, 304, and 306 are shown associated with users 312, 314, and 316, respectively. The update server 308 and the collection server 310 are communicatively connected to the client computers 302-306 via the network 318, which may be implemented as a local area network ("LAN"), wide area network ("WAN"), the Internet, or even a direct communication link. Also, as illustrated in FIG. 3, the collection server 310 is associated with a statistics database 320. As known to those skilled in the art and others, the computers illustrated in FIG. 3 may be configured to exchange documents, commands, and other types of data over the network 318.

The present invention provides a service to client computers 302-306 in the form of a cumulative malware cleaner that removes active malware from a computer. As known to those skilled in the art and others, some types of malware require affirmative action on behalf of a user to infect a computer. For example, one type of malware, commonly known as a virus, is unable to function as a standalone program. Instead, a virus attaches itself to an innocuous host, such as a word processing document, and implements malicious functionality when a user executes the host. In some instances, a user never issues a command to execute the host and, as a result, the virus is never executed. In other instances, malware is active on a computer whenever the computer is functioning. For example, modern computers typically support automatic program startup functions. Malware that infects a computer may alter configuration settings so that the malware is activated whenever the computer begins functioning.

In order to identify all malware on a computer, modern antivirus software searches every file on the computer for data that matches a malware signature. As known to those skilled in the art and others, searching file data is a slow and resource intensive process. However, in some instances, only active malware needs to be removed from a computer. For example, some malware spreads on a communication network, infecting a high percentage of computers connected to the network. Typically, this type of malware remains active on computers infected so that additional computers connected to the network may be infected. In this instance, where the malware is active on most, if not all, computers connected to the communication network, performing a traditional scan of file data on a computer is inefficient. Instead, the present invention identifies and removes active malware that is loaded in memory. Since the domain in which active malware may operate is limited, the present invention executes quickly when compared to traditional scanning techniques.

Returning to FIG. 3, the cleaner tool that complements aspects of the present invention is accessible from the update server 308. In general terms, the update server 308 acts as a distribution point for the malware cleaner. As described in more detail below with reference to FIGS. 4-6, client computers 302-306 may obtain the cleaner tool with an automatic update service. In this regard, the update server 308 may include a server-based application for automatically providing software updates to client computers via the network 318. Alternatively, the cleaner tool may be downloaded manually from a Web site or similar distribution system. To satisfy manual requests, the update server 308 may include a Web server application operative to publish the cleaner tool on the network 318 and satisfy requests to download the cleaner tool. In one embodiment of the present invention, updates to the cleaner tool are available at regular intervals (e.g., daily, weekly, monthly, etc.). Also, the updates are cumulative in that the active malware identified by the cleaner tool increases as new malware is released on the network 318.

After the cleaner tool searches and removes any active malware from a client computer, the results of the cleaning process may be reported to the collection server 310. In this regard, the collection server 310 is communicatively connected to the statistics database 320, which is capable of storing data. As described in more detail below, the type of data transmitted to the collection server 310 and stored in the statistics database 320 includes, but is not limited to, the identity of any malware on a client computer, whether the cleaner tool successfully removed the malware, and the existence of any error conditions. In this way, the data in the statistics database 320 assists developers in determining the severity of an infection, the ability of the cleaner to remove malware, and the frequency of multiple infections.

Now with reference to FIG. 4, components of the client computer 302 that include the software-implemented routines of the present invention will be described. As illustrated, the client computer 302 includes a cleaner tool 400 and an update client 402. In one embodiment of the present invention, components of the cleaner tool 400 include a stub module 404, an active malware-scanning engine 406, an installer 408, a reporting module 410, and a signature database 412. Also in the embodiment of the present invention illustrated in FIG. 4, the stub module 404 contains a user interface 414. The update client 402 communicates with a server-based application located on a remote computer (i.e., the update server 308) and automatically downloads the cleaner tool 400. The cleaner tool 400 searches specific locations on the client computer 302 and removes any active malware. Then the cleaner tool 400 writes the results of the actions performed to a log file. After data is written to the log file, the cleaner tool 400 is deleted from the client computer 302. However, the log file remains, so that later versions of the cleaner tool 400 may determine which actions were undertaken by earlier versions.

Figure 4:
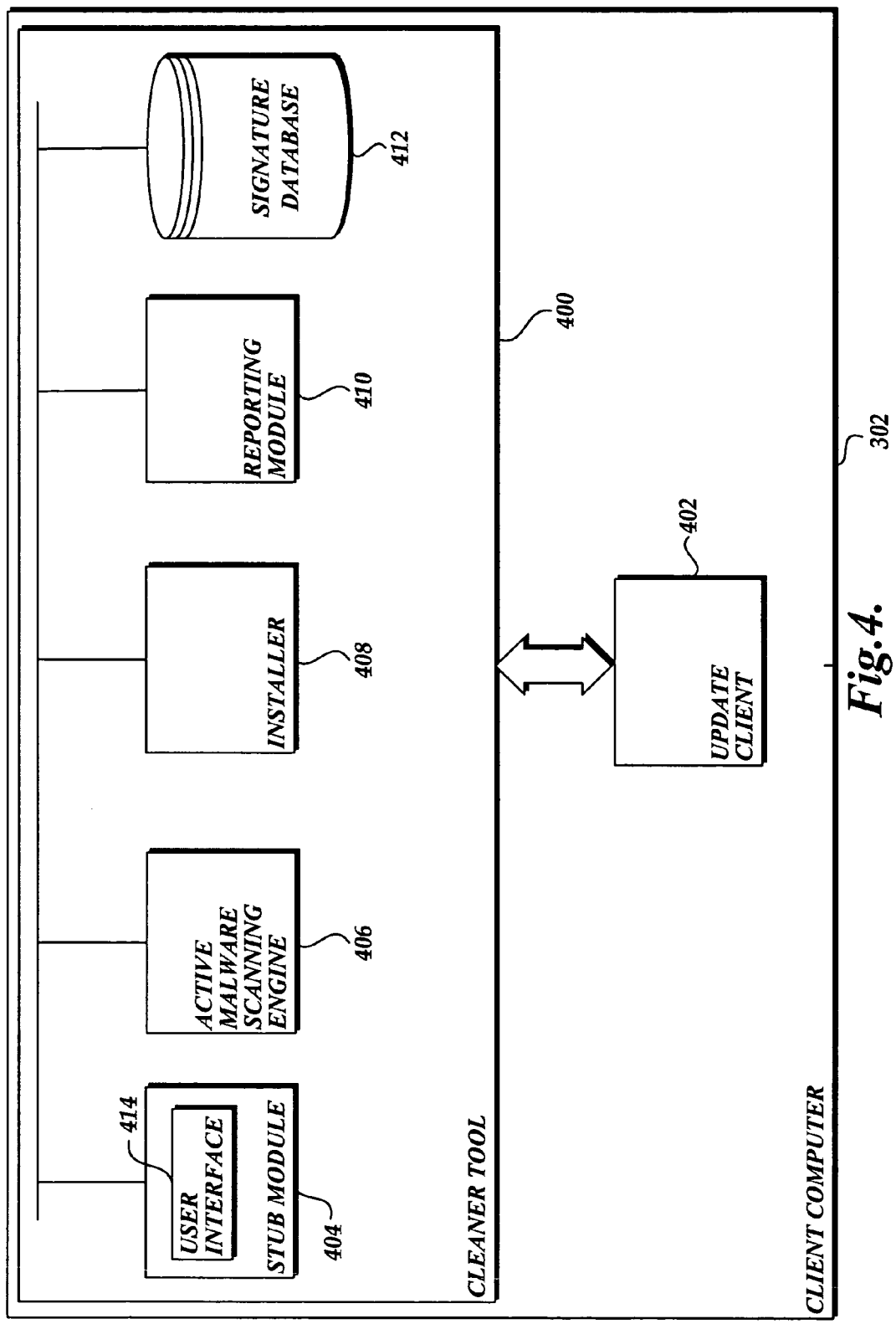
FIG. 4 is a block diagram of a set of components suitable to detect and remove active malware from a computer in accordance with the present invention.

As illustrated in FIG. 4, the client computer 302 includes an update client 402. In one embodiment of the present invention, the update client 402 is operative to automatically download aspects of the cleaner tool 400 required to scan for malware. If malware is identified, then additional data required to clean or remove the malware from the computer is also downloaded. A detailed description of an update client that was integrated with the present invention may be found in commonly assigned U.S. Pat. No. 6,493,871, issued Dec. 10, 2002, titled "METHOD AND SYSTEM FOR DOWNLOADING UPDATES FOR SOFTWARE INSTALLATION," the content of which is expressly incorporated herein by reference. As described previously, the cleaner tool 400 may be downloaded manually from a Web site or similar distribution system. In this instance, the update client 402 may not be installed on the client computer 302. Instead, the client computer 302 includes a Web browser client application capable of downloading the cleaner tool 400.

A component of the cleaner tool 400 shown in FIG. 4 is a stub module 404. The stub module 404 coordinates the actions performed by the active malware-scanning engine 406, and manages the information exchanged with the user. For example, the stub module 404 identifies any command line arguments and sets the mode of execution. In one embodiment of the present invention, the user may configure the cleaner tool 400 to execute in the "background" without input from the user. Alternatively, the cleaner tool 400 may be event driven so that actions taken occur in response to commands issued by the user. In any event, the stub module 404 identifies user preferences and sets the mode of execution. Then the active malware-scanning engine 406 and signature database 412 (discussed below) are loaded into memory. As discussed in further detail below, the active malware-scanning engine 406 and signature database 412 are configured to collectively identify and remove active malware from the client computer 302.

The stub module 404 includes a user interface 414 for communicating with users. As described previously, the cleaner tool 400 may execute in a mode that is event driven, so that active malware is identified and removed in response to user-generated commands. As known to those skilled in the art and others, a user interface is an input/output system characterized by the use of graphics on a computer display to communicate with a computer user. For example, information regarding any malware on the client computer 302 may be displayed on the user interface 414. Also, the user interface 414 allows a user to click buttons and generate commands in order to identify and remove malware from a computer.

The cleaner tool 400 also maintains an active malware-scanning engine 406, which provides the primary malware detection and removal functionality of the cleaner tool 400. In order to identify malware on a computer, modern antivirus software searches file data for a malware signature. However, in some instances, only active malware needs to be removed from a computer. Thus, the active malware-scanning engine 406 searches specific locations for data that is characteristic of active malware, including (1) configuration files, (2) data mapped in memory, and (3) file metadata. By analyzing only specific locations on a computer, the scanning engine 406 is able to identify malware much faster than existing antivirus software. If active malware is detected, the active malware-scanning engine 406 implements logic to remove the malware from the client computer 302. In this regard, the scanning engine 406 kills processes, removes entries in configuration files, and deletes files that are associated with active malware. As described in further detail below with reference to FIG. 6, the active malware-scanning engine 406 is also designed to remove self-preserving malware that generates new processes when detected.

As illustrated in FIG. 4, the client computer 302 includes an installer 408 operative to install the cleaner tool 400 on the client computer 302. Since, techniques for installing a program on a computer are generally known in the art, many functions of the installer 408 will not be described here. However, since the cleaning tool 400 only searches for a limited set of signatures associated with active malware, the functions performed by the installer 408 are fast when compared to installers associated with traditional antivirus software. For example, the data contained in the signature database 412 (described below) contains a fraction of the total number of known malware signatures. Thus, the amount of data "unpacked" by the installer 408 is small, thereby resulting in a quick installation process.

The cleaner tool 400 also maintains a reporting module 410 operative to gather and transmit data to a remote computer (i.e., the collection server 310). In one embodiment of the present invention, the stub module 404 receives data from the active malware-scanning engine 406 after it completes executing. The data includes, but is not limited to, the identity of any active malware on a client computer 302, whether the active malware was successfully removed, and the existence of any error conditions. The stub module 404 passes this data to the reporting module 410. Then the reporting module 410 transmits the data to a remote computer for storage and/or analysis by developers. As a result, developers may easily determine the severity of an infection and the effectiveness of the cleaner tool.

As illustrated in FIG. 4, another component of the cleaner tool 400 is a signature database 412. The signature database 412 typically maintains definitions of active malware that are particularly prolific and/or destructive. One technique for identifying malware includes obtaining a copy of the malware "in the wild." Then program code that implements the malware is processed with a hash function that converts the malware program code into a set of data that may be used to uniquely identify the malware. For each active malware identified by the present invention, the signature database 412 contains a signature of the malware generated using a hash function. When the active malware-scanning engine 406 scans data mapped in memory, the malware signatures in the database 412 are referenced for a match. In addition, the signature database 412 contains additional data used to identify malware. For example, some malware alters configuration files, such as a system registry. This type of data that describes attributes of active malware is also stored in the signature database 412.

As illustrated in FIG. 4, each component of the cleaner tool 400—e.g., the stub module 404, the active malware-scanning engine 406, the installer 408, the reporting module 410, and the signature database 412—is interconnected and able to communicate with other components. As known to those skilled in the art and others, FIG. 4 is a simplified example of one cleaner tool 400 and client computer 302 capable of performing the functions implemented by the present invention. Actual embodiments of the cleaner tool 400 and client computer 302 will have additional components not illustrated in FIG. 4 or described in the accompanying text. Also, FIG. 4 shows a component architecture for safely identifying and removing active malware from a client computer 302, but other component architectures are possible.

Figure 5:
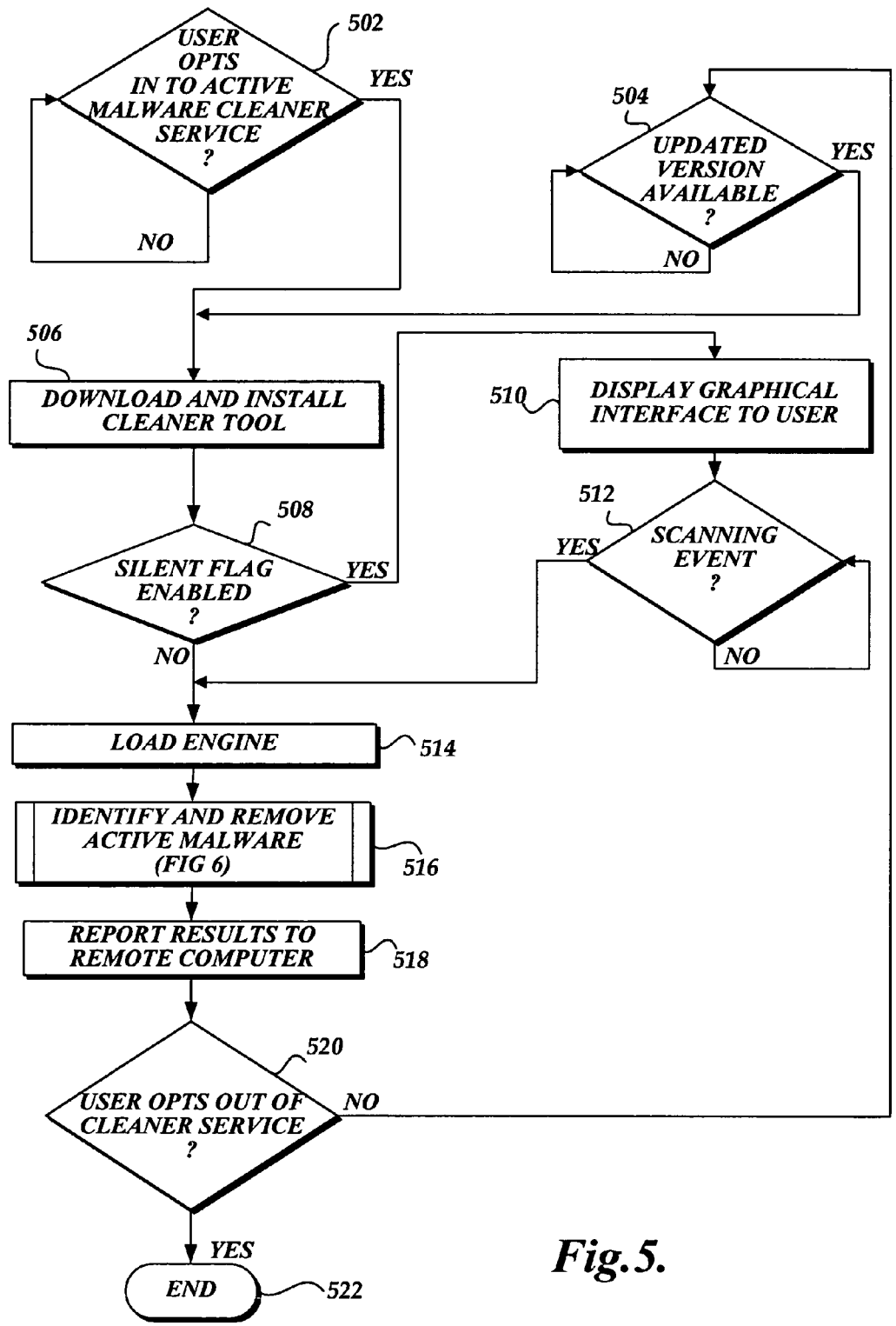
FIG. 5 is a flow diagram illustrating one exemplary embodiment of a method that identifies and removes active malware from a computer in accordance with the present invention.

FIG. 5 is a flow diagram illustrating one exemplary embodiment of a cleaning method 500 formed in accordance with the present invention. In summary, the cleaning method 500 causes a cleaner tool to be downloaded from a remote computer and installed on a local computer associated with a user. When the cleaner tool is installed, a search for active malware is performed. If active malware is detected, the cleaning method 500 identifies the malware and implements logic to remove the malware. Then data that describes the malware is transmitted to a remote computer so that developers may track the spread of malware and the effectiveness of the cleaner tool. With continuing reference to FIGS. 1-4 and the accompanying descriptions, an exemplary cleaning method 500 illustrated in FIG. 5 will now be described.

As illustrated in FIG. 5, the cleaning method 500 begins at either block 502 or block 504. As mentioned above, the present invention provides a service that removes active malware from a computer. In order to identify and remove newly discovered malware, developers regularly update the cleaner tool in order to detect the newly discovered malware. At decision block 502, the cleaning method 500 remains idle and waits until a user generates input that indicates a willingness to participate in the service provided by the present invention. In one embodiment, after a user indicates a willingness to participate in the service, updated versions of the cleaner tool are automatically installed when they become available. For example, the update client 402 (FIG. 4) may be used to automatically download and install the cleaner tool. When a user is already a participant in the service, the cleaning method 500 begins at decision block 504. In this instance, an updated version of the cleaner tool was made available from a download center. As mentioned previously, in one embodiment of the present invention, updates are made available at regular intervals (e.g., daily, weekly, monthly, etc.). In any event, the cleaning method 500 may begin at either decision block 502 or 504, depending on whether the user is already a participant in the cleaner service.

At block 506, the cleaning method 500 downloads and installs the cleaner tool from the download center. Since communication protocols for transmitting data over a network and methods for installing programs are generally known in the art, descriptions of the techniques used to implement this aspect of the method 500 will not be provided here. However, it should be well understood that downloading and installing the cleaner tool may be performed quickly. At block 506, only program code that is required to scan for malware is downloaded. As described in more detail below, only when malware is detected will additional data required to clean the malware infection be downloaded.

At decision block 508, the cleaning method 500 determines whether a "silent flag" was enabled when the cleaner tool was installed at block 506. As mentioned previously, a user of the present invention may set different modes of execution. For example, the user may configure the present invention to execute in the background without obtaining input from the user. Alternatively, the actions performed by the present invention may be event-driven so that malware detection and removal is performed in response to user-generated commands. Typically, a user will input the mode of execution during the installation process. When the cleaner tool begins executing, the value of the variable (i.e., the silent flag) that represents the mode of execution is identified from a command line argument. If the silent flag indicates that the present invention will operate in the background, the cleaning method 500 proceeds to block 514 described below. Conversely, if the silent flag indicates that the present invention will perform actions in response to user commands, the cleaning method 500 proceeds to block 518.

As illustrated in FIG. 5, the cleaning method 500 at block 510 displays a graphical user interface to the user. If block 510 is reached, the mode of execution is set so that actions are performed in response to commands generated by the user. In one embodiment of the present invention, the graphical user interface is a "wizard" that includes a sequence of prompts for displaying options to the user. For example, one option available to the user with the wizard is a command to scan for active malware. As known to those skilled in the art and others, a wizard that generates prompts and performs actions in response to commands generated by a user is one example of a graphical user interface.

At block 512, the cleaning method 500 remains idle until a scanning event is received. If block 512 is reached, the mode of execution is set so that actions are performed in response to commands generated from a graphical user interface. Since methods for receiving events from a graphical user interface are generally known in the art, the technique used at block 512 to listen for a scanning event will not be described here.

In order to scan for active malware, the stub module 404 (FIG. 4) loads the active malware-scanning engine 406 into memory at block 514. Typically, to execute a program, an address space (i.e., memory) for the program is allocated and the code and data that implement the functionality of the program are loaded into the initialized address space. At block 514, the active malware-scanning engine 406 is loaded into memory by the stub module 404 so that a scan for active malware may be performed.

At block 516, a scan for active malware that is defined in the signature database 412 is performed. If the scan detects malware on the computer, logic in the active malware-scanning engine 406 removes the malware. One embodiment of a method that identifies and removes active malware from a computer in accordance with the present invention is described below with reference to FIG. 6.

As illustrated in FIG. 5, data is reported, at block 518, to a remote computer. As described previously with reference to FIG. 3, data that describes the state of a computer and actions performed by the cleaner tool is helpful to developers in identifying the severity of an infection and in preventing the spread of malware. At block 518, the cleaner method 500 sends data to a remote computer that includes, but is not limited to, the identity of any malware found on the computer, whether the malware was successfully removed, and the existence of any error conditions caused by the cleaner tool. The data transmitted at block 518 may be formatted to facilitate searching and sorting functions available from modern databases. As known to those skilled in the art, other types of data may also be transmitted to a remote computer at block 518 and the examples provided above should be construed as exemplary and not limiting.

At decision block 520, the cleaner method 500 determines whether the user chose to "opt out" of the service provided by the present invention. Since aspects of the present invention may be event driven, a user may "opt out" of the service at any time by accessing a user interface and issuing a command. If the user chose to "opt out," the method 500 proceeds to block 522, where it terminates. Conversely, if the user will receive the cleaner tool in the future, the cleaning method 500 proceeds back to block 504 and blocks 504 through block 520 repeat until the user "opts out" of the service.

Implementations of the present invention are not limited to the exemplary method 500 shown in FIG. 5. Other methods may include additional actions or eliminate some actions shown. For example, the exemplary method 500 shown in FIG. 5 is described in the context of system where software updates are provided automatically with an update program. However, as mentioned previously, the cleaner tool may be downloaded manually from a Web site or similar distribution system. In this embodiment, blocks 502 and 504 described above are not performed. Thus, the method 500 depicted in FIG. 5 and described in the accompanying text is one embodiment of the present invention, and other embodiments are possible.

Figure 6:
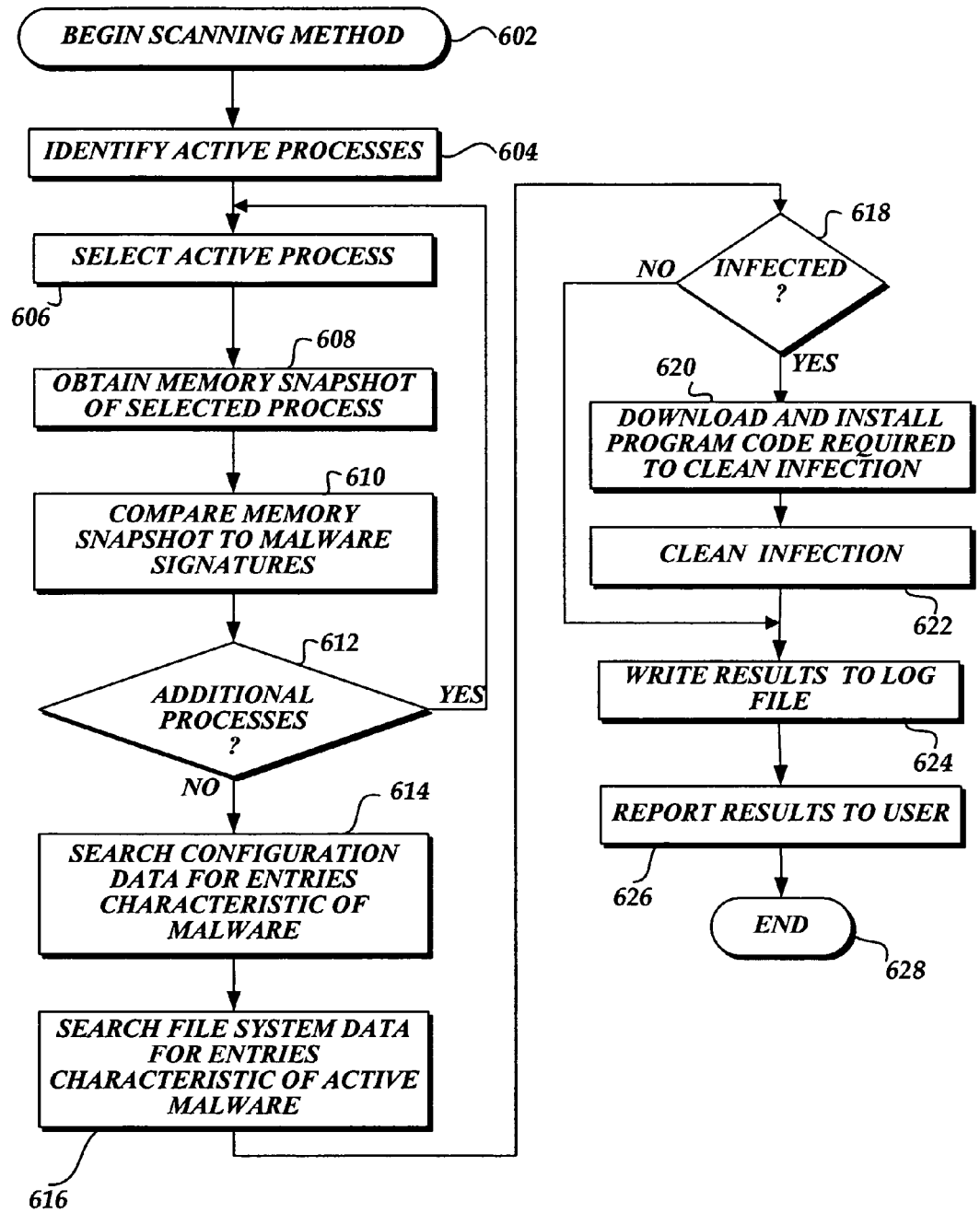
FIG. 6 is a flow diagram illustrating one exemplary embodiment of a method that may be used in conjunction with the method illustrated in FIG. 5 to identify and remove active malware from a computer in accordance with the present invention.

FIG. 6 is a flow diagram illustrating one exemplary embodiment of a scanning method 600 formed in accordance with the present invention. In summary, the scanning method 600 determines when active malware is present on a computer. If active malware is present, the method 600 removes the malware. With continuing reference to FIGS. 1-5 and the accompanying descriptions, an exemplary scanning method 600 illustrated in FIG. 6 will now be described.

As illustrated in FIG. 6, the scanning method 600 begins at block 602. Typically, scanning for malware begins after the active malware-scanning engine 406 (FIG. 4) is loaded in memory. In this instance, the scanning method 600 is designed to work in conjunction with the cleaning method 500 described above with reference to FIG. 5. However, actions performed by the scanning method 600 may be implemented by other programs that are not described herein. For example, any program may issue a call to the active malware-scanning engine 406 (FIG. 4) to initiate a scan for active malware.

At block 604, the scanning method 600 identifies the processes on the computer. As known to those skilled in the art and others, in order to execute a program, code and data associated with the program are loaded in memory. Internally, a program that is being executed or scheduled to be executed is represented as a "process." In order to support switching between processes, modern computers maintain a table (hereinafter referred to as a "process table") that contains an entry for each process on the computer. The process table contains information necessary to restart a suspended process, such as a process memory state that includes pointers to the memory areas used by the process. As described in further detail below, data in the process table is used to identify data that is loaded in memory. In any event, active processes are identified at block 604 by performing a table lookup of the process table using techniques generally known in the art.

As illustrated in FIG. 6, the scanning method 600 selects a process in the process table described at block 604. The scanning method 500 sequentially selects each process in the process table and obtains a memory "snapshot" of the selected process. Then the program code and data associated with the selected process are scanned for data characteristic of malware.

At block 608, a memory snapshot of the selected process that identifies the program code and data used by the process is obtained. As described previously, modern computers maintain a process table that stores pointers to areas of memory used by a process. At block 608, the scanning method 500 performs a table lookup in the process table and identifies the memory locations that store the program code and data that are associated with selected process At block 610, the program code and data in memory associated with the selected process are scanned for a malware signature. As described previously with reference to FIG. 4, one known technique for identifying malware includes (1) obtaining a copy of the malware, (2) generating one or more malware signatures using a hash function, and (3) comparing the signature to data in a file or data stream. The signature database 412 (FIG. 4) stores a plurality of malware signatures that were generated using a hash function. At block 610, program code and data in memory that are associated with the selected process are compared to malware signatures in the signature database 412 for a match. Since techniques for comparing data are generally known in the art, further description of the techniques implemented by the presented invention at block 610 to search the signature database 412 will not be described here.

Scanning data that is loaded in memory, as occurs at block 610, reduces the time required to identify and remove malware from a computer. For example, as known to those skilled in the art and others, when a file or data stream is scanned for a malware signature, data is typically read from an Input/Output ("I/O") device, such as a hard drive. Performing read operations from an I/O device is substantially slower than performing read operations on data that is loaded in memory. Also, in one embodiment of the present invention, only signatures of high priority malware are contained in the signature database 412. Performing a search of a database that contains malware signatures is a resource-intensive process. For example, some databases contain a signature for each malware known to infect computer systems. In this instance, identifying malware is slow since each signature in the database is compared to data in a file or data stream. In one embodiment of the present invention, the signature database 412 contains a limited set of signatures known to be spreading on a communication network. Obviously, searching for a limited set of malware reduces the number of comparisons made, thereby decreasing the time period required to identify malware.

At block 612, the scanning method 600 determines whether all of the processes in the process table have been selected. As described above, the process table contains an entry for each process that is executing or scheduled to be executed. Unless all of the processes have been selected, additional processes will be selected so that all program code and data in memory are scanned for malware. In any event, if all of the processes were previously selected, the method 600 proceeds to step 614, described below. Conversely, if any process was not previously selected, the method 600 proceeds back to step 606 and steps 606 through 612 repeat until all of the processes have been selected.

As illustrated in FIG. 6, the scanning method 600 searches for configuration data that is characteristic of malware at block 614. Typically, malware that infects a computer alters configuration files so that the malware is activated when a computer begins functioning. For example, an entry may be made in the system registry so that malware is added to a "startup" menu of programs that begin executing each time an operating system "boots." As known to those skilled in the art and others, the system registry is a file used to store settings, options, and preferences regarding the operation of a computer, including preferences that identify programs activated at startup. By way of another example, malware may register as a service with a component of the operating system known as the service control manager ("SCM"). When a malware registers as a service, the functionality of the malware may be activated whenever the computer is functioning. In addition to matching malware signatures, the signature database 412 (FIG. 4) is also used to identify configuration data characteristic of malware. Thus, at block 614 the scanning method 600 scans the system registry and the SCM for one or more entries that are characteristic of malware. In this regard, the signature database 412 is queried during the scan to determine if the computer is infected with malware.

At block 616, file system metadata is searched for entries that are characteristic of malware. As known to those skilled in the art and others, each file on a computer is associated with metadata that describes attributes of the file. For example, a file name, permissions, location, and size are all contained in file metadata. In some instances, malware designers use naming conventions or other invariable methods of storing files that contain malware. For example, malware designers frequently use a file name that appears to be a critical system file to discourage users from deleting the file. The signature database 412 (FIG. 4) is used to identify file metadata that is characteristic of malware. At block 614, the scanning method 600 scans the file system for metadata that is characteristic of malware. In this regard, the signature database 412 is queried during the scan to determine if the metadata being scanned is associated with a file that contains malware.

At decision block 618, the scanning method 600 determines whether malware was detected on the computer. If malware was not detected, the method 600 proceeds to block 624 described below. Conversely, if malware was detected, the method 600 proceeds to block 620.

At block 620, the scanning method 600 downloads and installs program code designed to remove the malware from the computer. In order to minimize impact on a user, the present invention only downloads program code used to remove malware when an infection is detected. If block 620 is reached, a computer is infected with malware and program code designed to remove the malware is needed. Since communication protocols for transmitting program code over a network are generally known in the art, descriptions of the techniques used to implement this aspect of the method 600 will not be provided here.

At block 622, the scanning method 600 removes any malware that was detected on the computer. In one embodiment of the present invention in which execution occurs in the background, malware is removed automatically without additional user input. In another embodiment, malware is removed in response to a command generated from a user interface. In any event, one known technique for automatically removing malware from a computer includes (1) "killing" or terminating processes associated with the malware, (2) removing malware-generated entries in configuration files such as the system registry, and (3) deleting files that contain malware program code and data. One aspect of the present invention records or "journals" the actions required to remove malware. Simply stated, this aspect of the present invention identifies all actions required to remove the malware before starting the removal process, thereby insuring that all malware components are identified. In some instances, if the actions required to remove malware are not identified before starting the removal process, components of the malware may be difficult or impossible to identify. For example, an entry in the system registry may point to a file that is executed each time a computer "boots." Deleting this entry in the system registry may make it difficult or impossible to later identify the file associated with the entry. Thus, to remove all of the components of malware, the present invention creates journal entries for each action required to remove the malware. Also, in the event that changes made by the cleaner were incorrectly applied, the journal may be used to restore the computer to the state that existed before the journal entries were executed.

Some malware implement self-preservation techniques designed to prevent removal of the malware from a computer. For example, two processes may be used to implement a self-preservation technique. In this instance, a first process implements the functionality of the malware and the second process monitors the status of the first process. The second process remains dormant until a command to terminate the first process is issued. Then the second process causes the computer to become infected again after the first process terminates. The present invention is designed to remove from a computer malware that implements self-preservation techniques. For example, when a process associated with malware is identified, the process is immediately suspended. Suspending a process ends the operation of the process but does not typically trigger the creation of additional processes that may be used to reinfect the computer. In this example the present invention suspends both malware processes, thereby preventing either of the processes from reinfecting the computer. Then the actions required to remove the malware are entered in the journal. Typically, these actions include the same actions described above, namely, (1) "killing" or terminating processes associated with the malware, (2) removing malware-generated entries in configuration files, and (3) deleting files that contain program code and data associated with the malware. Then the journal entries are sequentially executed, resulting in the removal of the malware.

At block 624, the results of the actions performed by the cleaner tool are recorded in a log file. As mentioned previously, executable and installer files are removed from a computer after the cleaner tool completes executing. Since future versions of the cleaner tool may need to know the identity of any previously installed cleaner tools, a version number for the cleaner tool is recorded in the log file. Also, the identity of any malware detected and whether the malware was successfully removed are recorded in the log file. However, it should be well understood that other data will typically be recorded in the log file and the examples provided above should be construed as exemplary, and not limiting.

At block 626, the results of the routines performed by the cleaner tool are reported to the user. As described previously, a user of the present invention may set different modes of execution, including a mode where execution occurs in the background. In this instance, the present invention does not report the results of the scanning method 600 to the user at block 626. Alternatively, the actions performed by the present invention may be event driven, so that malware detection and removal are performed in response to user-generated commands. In this instance, after the cleaning method 600 attempts to remove the malware, the results are displayed to the user. Then the scanning method proceeds to block 628 where it terminates.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a computer that includes a client application for communicating with a remote computer, a computer-implemented method of removing active malware from the computer, the method comprising:
   searching a set of locations on the computer for active malware;
   identifying active malware resident on the computer;
   identifying actions required to remove the identified active malware resident on the computer;
   downloading and installing a software application having routines that remove the active malware from the remote computer after the active malware is identified as resident on the computer;
   creating journal entries for each required action before any of the required actions are executed;
   executing the routines of the software application to remove the active malware from the computer;
   storing the results of the execution of the routines in a log file that remains on the computer after the software application is removed;
   transmitting data to the remote computer that includes the identity of any active malware identified on the computer and whether the malware was successfully removed; and
   removing the software application after storing the results of the execution of the routines and transmitting the data to the remote computer.

2. The method as recited in claim 1, further comprising storing information in the log file on the computer that includes the identity of any active malware identified and whether the malware was successfully removed.

3. The method as recited in claim 1, wherein routines that search a set of data on the computer for active malware are included in a software application that is downloaded from the remote computer.

4. The method as recited in claim 1, wherein a software application is automatically downloaded and installed on the computer when an updated version of the software application becomes available.

5. The method as recited in claim 1, wherein searching a set of locations on the computer for active malware includes:
   identifying the active processes on the computer;
   identifying data in memory that is associated with the active processes; and
   comparing the data in memory to malware signatures.

6. The method as recited in claim 5, wherein identifying the active processes includes performing a search of a table that stores the state associated with the active processes.

7. The method as recited in claim 5, wherein the malware signatures are generated using a hash function.

8. The method as recited in claim 1, wherein searching a set of data on the computer for active malware includes searching configuration databases for entries generated by malware.

9. The method as recited in claim 8, wherein a configuration database searched is a system registry.

10. The method as recited in claim 1, wherein searching the computer for active malware includes searching metadata for file names that are associated with active malware.

11. The method as recited in claim 1, wherein identifying the actions required to remove the active mal ware includes suspending processes generated by the malware 12. The method as recited in claim 1, wherein executing the actions required to remove the active malware from the computer includes: killing processes associated with the malware;
    removing entries made by the malware in configuration databases; and
    deleting files used by the malware.

13. A system embodied on a computer-readable storage medium bearing computer-executable instructions that, when executed by a processor operatively coupled to memory on a computer that includes a client application for communicating with a remote computer, carries out a method for removing active malware from the computer, the method comprising:
    searching a set of locations on the computer for active malware;
    identifying active malware in the searched set of locations;
    identifying actions required to remove identified active malware from the computer;
    downloading and installing computer-executable instructions to the computer having routines that when executed, perform the actions required to remove the identified active malware, the instructions are downloaded from the remote computer after the active malware is identified as resident on the computer;
    creating journal entries for each required action before any of the required actions are executed;
    executing the routines configured to remove the active malware from the computer;
    storing the results of the execution of the routines in a log file that remains on the computer after the instructions having the routines are removed from the computer;
    transmitting data to the remote computer that includes the identity of any active malware identified on the computer and whether the malware was successfully removed; and
    removing the instructions having the routines from the computer after the results are stored in a log file and the data is transmitted to the remote computer.

14. The method as recited in claim 13, further comprising storing information in the log file on the computer that includes the identity of any active malware identified and whether the malware was successfully removed.

15. The method as recited in claim 13, wherein routines that search a set of data on the computer for active malware are included in a software application that is downloaded from the remote computer.

16. The method as recited in claim 15, wherein a software application is automatically downloaded and installed on the computer when an updated version of the software application becomes available.

17. The method as recited in claim 13, wherein searching a set of locations on the computer for active malware includes;
    identifying active processes on the computer;
    identifying data in memory that is associated with the active processes;
    and comparing the data in memory to malware signatures.

18. The method as recited in claim 17, wherein identifying the active processes includes performing a search of a table that stores a state associated with the active processes.

19. The method as recited in claim 17, wherein the malware signatures are generated using a hash function.

20. The method as recited in claim 13, wherein searching a set of data on the computer for active malware includes searching configuration databases for entries generated by malware.

21. The method as recited in claim 20, wherein a configuration database searched is a system registry.

22. The method as recited in claim 13, wherein searching the computer for active malware includes searching metadata for file names that are associated with active malware.

23. The method as recited in claim 13, wherein identifying the actions required to remove the active mal ware includes suspending processes generated by the malware.

24. The method as recited in claim 13, wherein executing the actions required to remove the active malware from the computer includes:
    killing processes associated with the malware; removing entries made by the malware in configuration databases; and deleting files used by the malware.

25. A computer system comprising a processor and memory which stores one or more computer executable components that when executed by the processor perform the following steps to remove active malware from the computer system:
    search a set of locations on the computer for active malware; identify
    active malware resident on the computer;
    identify actions required to remove the identified active malware resident on the computer;
    download and installing a software application having routines that remove the active malware from the remote computer after the active malware is identified as resident on the computer;
    create journal entries for each required action before any of the required actions are executed;
    execute the routines of the software application to remove the active malware from the computer;
    store the results of the execution of the routines in a log file that remains on the computer after the software application is removed;
    transmit data to the remote computer that includes the identity of any active malware identified on the computer and whether the malware was successfully removed; and
    remove the software application after storing the results of the execution of the routines and transmitting the data to the remote computer.

26. The computer system as recited in claim 25, wherein the one or more computer executable components further perform the step of automatically downloading and installing the software application when a new version of the software application becomes available.

27. The computer system as recited in claim 25, wherein the one or more computer executable components farther perform the step of suspending processes generated by malware when malware is detected.

28. The computer system as recited in claim 25, wherein the set of locations includes configuration databases on the computer.

29. The software system as recited in claim 25, wherein the set of locations includes a table that stores a state associated with active processes running on the computer system.

30. The software system as recited in claim 25, wherein the set of locations includes metadata that identifies file names that are associated with active malware.

* * * * *